Patented July 19, 1932

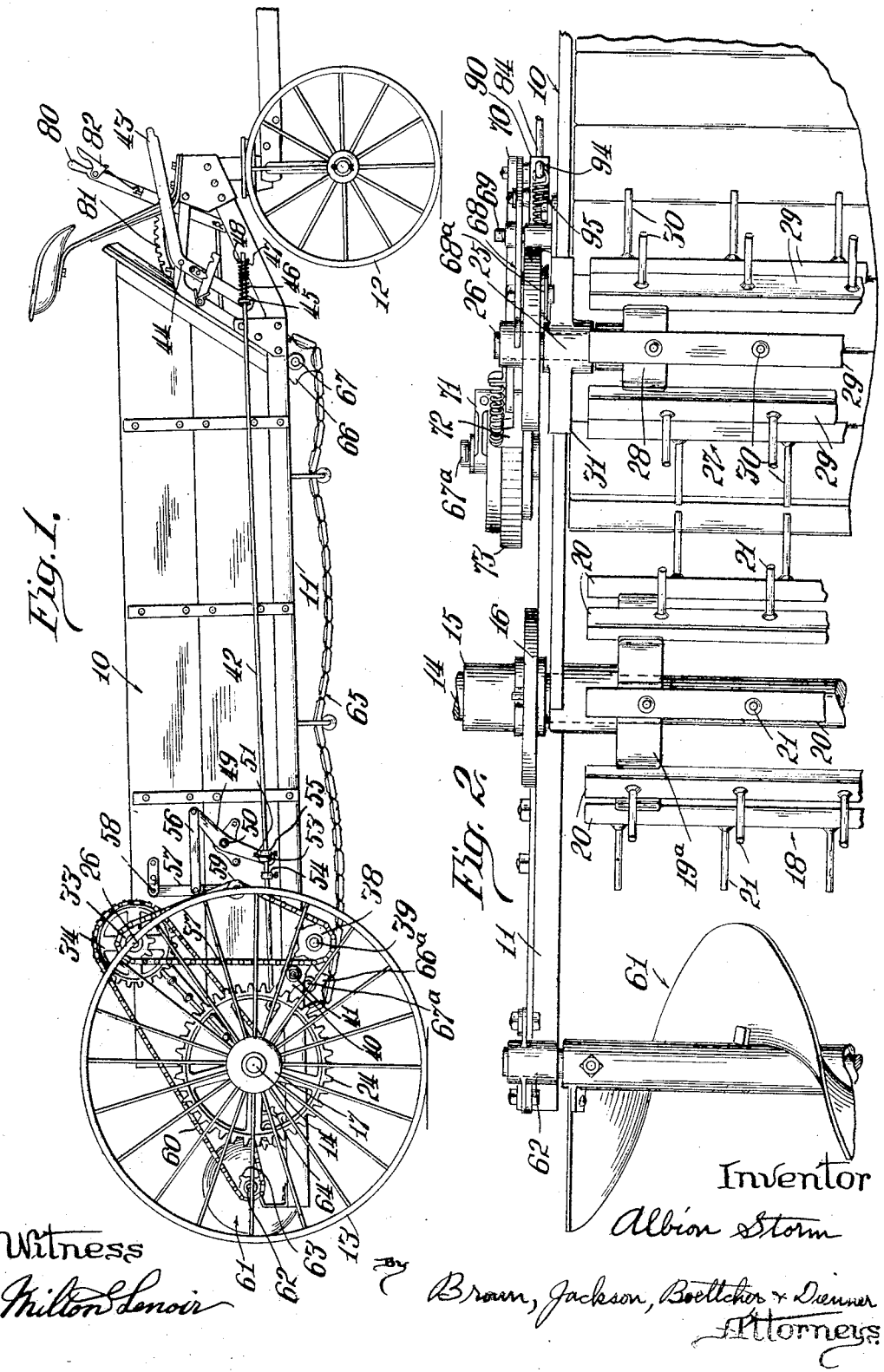

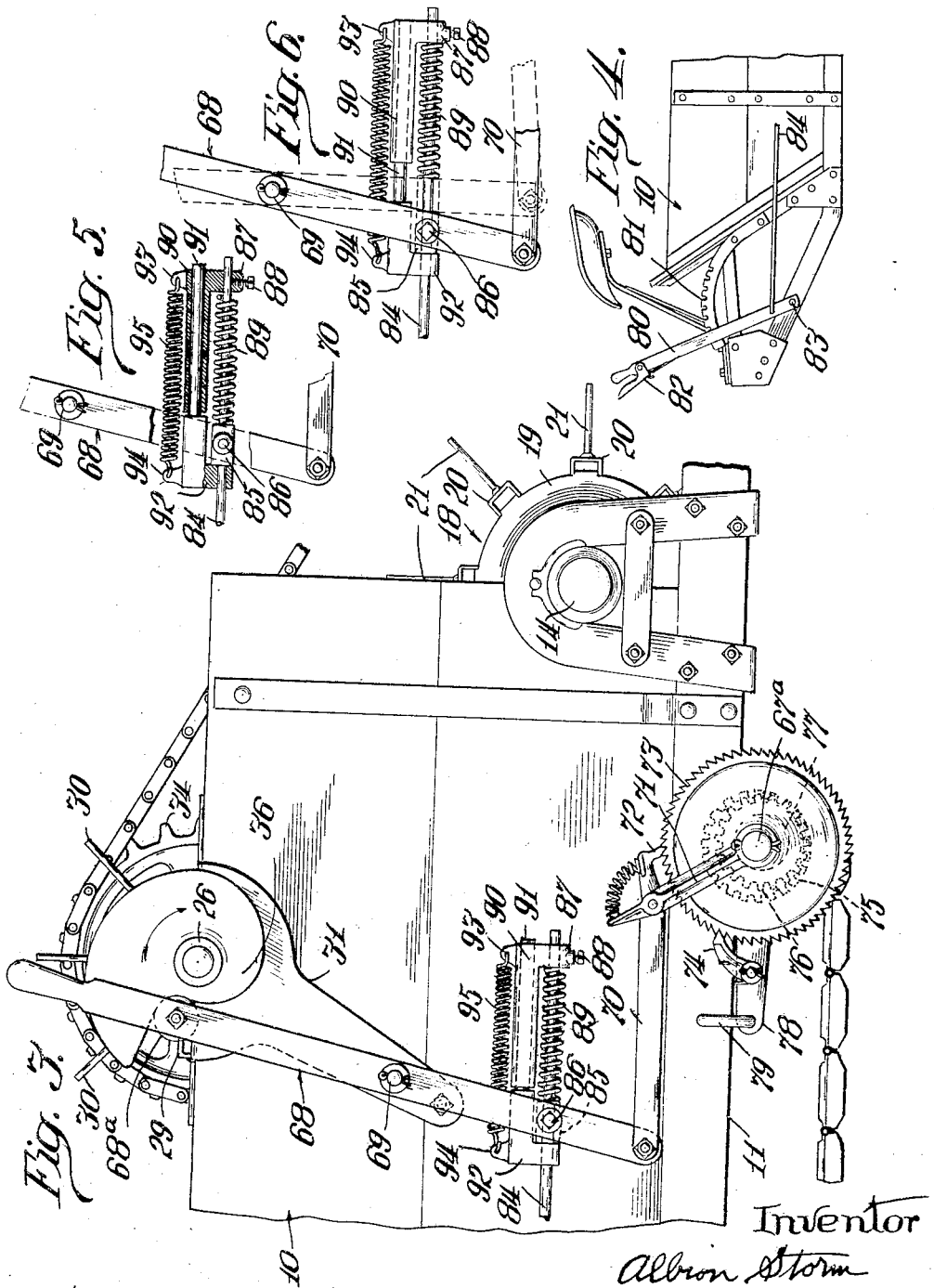

1,868,337

UNITED STATES PATENT OFFICE

ALBION STORM, OF SHERKSTON, ONTARIO, CANADA, ASSIGNOR TO DEERE & COMPANY, OF MOLINE, ILLINOIS, A CORPORATION OF ILLINOIS

MANURE SPREADER

Original application filed March 21, 1925, Serial No. 17,321. Patent No. 1,724,379, dated August 13, 1929. Divided and this application filed July 10, 1929. Serial No. 377,249.

My invention relates to manure spreaders of the well-known type comprising a vehicle body mounted on front and rear wheels, a traction driven rear axle on which the rear wheels are mounted, and by the forward rotation of which it or the driving parts mounted thereon are driven, a rotary beater which is preferably mounted on the rear axle, and a traveling apron or conveyor, the upper course of which in its intermittent movement conveys the contents of the vehicle rearwardly to gradually feed the same to the beater. A manure spreader of this general type is shown and described in my prior Letters Patent No. 1,724,379, dated August 13, 1929, the present application being a division of said patent.

The subject-matter of the present application pertains to the means for regulating the rate of feed of the load to the distributing mechanism, having as its object to provide improved means of such character that the adjustment of the rate of feed may be made not only when the distributing mechanism is in operation, but also when it is at rest, and without imposing on the operator the burden of moving the load in making such adjustment, which object is accomplished as illustrated in the drawings and as hereinafter described. What I regard as new is set forth in the claims.

In the accompanying drawings,—

Fig. 1 is a side elevation of a manure spreader embodying my improvements;

Fig. 2 is a plan view of one side of the rear portion of the spreader, some parts being broken away;

Fig. 3 is a side elevation of the rear portion of the spreader, illustrating the mechanism for actuating the feeding apron and for regulating the rate of feed;

Fig. 4 is a detail, being a partial side elevation of the front portion of the spreader showing the manually operated lever for adjusting the rate of feed; and Figs. 5 and 6 are details, showing different positions of the feed regulating mechanism.

Referring to the drawings,—10 indicates the usual vehicle body and 11 the side sills thereof, 12 the front wheels and 13 the rear wheels. The rear wheels are mounted on a rear axle 14 journaled on the vehicle body in any suitable way, but preferably in boxes 15 carried by brackets 16 secured to the side sills 11. It will be understood that the rear wheels 13 are connected with the rear axle 14 by means of the usual ratchet connections contained in housings 17, so that forward rotation of the wheels will drive the rear axle, but said wheels will be free to rotate in the opposite direction independently of the axle, as is necessary in rounding curves.

Loosely mounted on the rear axle 14 is a main beater 18, of any approved design, preferably consisting of spiders or heads 19, 19a, cross-connected by bars 20 provided with radial fingers 21. Also mounted on and keyed to the rear axle 14 is a large driving sprocket wheel 24, the hub of which lies between the journal box 15 and the inner end of the hub of the wheel 13 at the side of the machine shown in Fig. 1.

Journaled in suitable bearings 25 supported by the upper rear portion of the vehicle body at opposite sides thereof is a countershaft 26, which in the embodiment of my invention illustrated is designed to carry an auxiliary beater 27, comprising heads 28 mounted on the end portions of the countershaft 26 and connected by cross-bars 29 provided with radial fingers 30, see Fig. 2. The heads 28 are suitably keyed to the countershaft so that they rotate therewith. Preferably the bearings 25 are formed in brackets 31 suitably secured to the side boards of the vehicle body.

The countershaft 26 is somewhat longer than the width of the vehicle body, and at the end adjacent to the ground wheel 13 at the right hand side of the machine as shown in Fig. 1 it carries a small sprocket wheel 33 and a larger sprocket wheel 34, which are preferably made integral with each other, and suitably keyed to said countershaft. It should be understood that while my improved driving mechanism is well adapted for use in connection with manure spreaders provided with an auxiliary beater and with a lateral distributor, it is also applicable to manure spreaders not equipped with such elements, and the term "countershaft" as herein used is therefore intended to comprehend either a shaft that extends entirely across the vehicle body, or any sufficient means for supporting and connecting the sprocket wheels 33, 34 so that they are operatively connected together and serve as power transmitting devices in the manner hereinafter described.

At the opposite end of the countershaft 26 from that which carries the sprocket wheels 33, 34, it is provided with a cam 36 keyed thereto, (see Fig. 3), by means of which the feeding mechanism is actuated, as will be hereinafter described.

The sprocket wheel 33, and through it the countershaft 26, is driven by a link belt 37 which travels around said sprocket wheel and depends therefrom at the side of the vehicle body, the lower portion of said belt being supported by a pinion 38, preferably in the form of a small sprocket wheel, which is mounted on a stud 39 carried by one arm of a lever 40 fulcrumed upon a pivot 41, so that it may swing in a vertical plane, and thereby move the pinion 38 fore and aft. As shown in Fig. 1, the link belt 37 travels around the pinion 38, and consequently by swinging the lever 40 about its pivot the lower end of said belt may be swung fore and aft to move it into or out of engagement with the teeth of the driving sprocket wheel 24. For swinging the lever 40 I provide an operating rod 42, the rear end of which is connected with the upper arm of said lever, while the forward end of said rod is connected to a manually operated lever 43 fulcrumed at 44 adjacent to the driver's seat, so that it may conveniently be operated.

The connections between the rod 42 and lever 43 comprise an eye 45 projecting laterally from the lower portion of said lever, through which eye the front end of the rod 42 extends, and a spring 46 mounted on said rod between the eye 45 and a collar 47 secured on said rod by a cotter pin 48, as shown in Fig. 1. The spring 46, therefore, serves as a cushioning device between the lever 43 and the rod 42.

It will be obvious from an inspection of Fig. 1 that rocking of the lever 40 varies the length of the loop formed by the link belt 37, and, therefore, it is necessary to provide means for compensating for this variation. This is accomplished by providing a lever 49 that is fulcrumed between its ends at 50 at the side of the vehicle body, as shown in Fig. 1, so that it swings in a vertical plane. The lower end of said lever is provided with a slot 51 which receives the stem of an eye-bolt 53 through which the rod 42 extends. At opposite sides of said eye-bolt the rod 42 is provided with adjustable collars 54, 55 set a short distance apart, so that a little lost motion is provided between the lower end of the lever 49 and the rod 42. The upper end of said lever is connected by a link 56 with a fore and aft swinging bar 57 pivoted at its upper end to the side of the vehicle body by a pivot 58, as shown in Fig. 1. The lower end of said bar carries a roller 59 over which the forward course of the link belt 37 travels, so that said roller serves as a belt tightener.

It will be apparent from the foregoing description that longitudinal movement of the rod 42 to rock the lever 40 will at the same time rock lever 49, and, therefore, move the roller 59 longitudinally of the machine in conformity with the fore and aft swinging of the belt 37, as clearly indicated by the dotted lines in Fig. 3. Widening of the loop of said belt of course shortens its length, and, therefore, by the means described said belt is always maintained taut. Also, it will be seen that swinging of the lever 40 in one direction or the other will move the belt 37 into or out of operative engagement with the driving sprocket wheel 24. When said belt is in engagement with the driving sprocket wheel, the sprocket wheels 33, 34 will be driven continuously, as distinguished from the intermittent driving of the feeding mechanism hereinafter described, and the countershaft 26 and through it the auxiliary beater 27 and the cam 36 will also be driven continuously.

For driving the main beater 18 a link belt 60 is provided that travels around and is driven by the sprocket wheel 34, the lower course of said belt passing under and operatively engaging a sprocket wheel (not shown) which is connected with the main beater 18. Thus said beater is continuously driven from the countershaft 26 and in the same direction, which direction is opposite to that in which the sprocket wheel 24 and rear axle 14 rotate. In the construction illustrated the machine is provided with a lateral distributor 61, of the well-known helical type, carried by a transverse shaft 62 provided with a sprocket wheel 63, as shown in Fig. 1. The latter sprocket wheel is driven by the link belt 60 which travels around the same and over an idler sprocket wheel 64 by which its tension is regulated, said sprocket wheel 64 being mounted in adjustable bearings for that purpose.

Coming now to the improvements to which the present application relates, the bottom of the vehicle body is formed by an endless apron 65 operating over suitable rotary supports 66, 66a carried by transverse shafts 67, 67a at opposite ends of the vehicle, so that the upper course of said apron lies between the side sills 11. Of course, it is to be understood that my improvements are applicable to that type of manure spreader which is provided with a solid bottom and having a conveyor comprising side chains and cross slats, the upper course of which conveyor travels along the top surface of the bottom of the vehicle, the slats being spaced apart so that as they slide along the bottom of the vehicle they act to convey the material to the beater. The load to be distributed is fed rearwardly by intermittently moving the upper course of said apron in that direction through suitable mechanism driven from the rear axle 14, as will now be described. It has already been explained that the cam 36 carried by the countershaft 26 actuates the feeding mechanism, and by reference to Fig. 3 it will be seen that a lever 68 is associated with said cam to be rocked fore and aft thereby about a pivot 69. Said lever is provided with a roller 68a that bears against the periphery of the cam 36, and obviously when said cam rotates in the direction indicated by the arrow in Fig. 3 it will act to swing the upper end of said lever to the left as viewed in said figure. The lower end of said lever is connected by a link 70 with a radial arm 71 mounted on the shaft 67a and provided with a pawl 72 adapted to engage the teeth of a ratchet wheel 73 also mounted on said shaft. A detent 74 serves to prevent reverse rotation of said ratchet wheel.

The ratchet wheel 73 is loosely mounted on the shaft 67a, and is arranged to be operatively connected therewith by means of an internal gear 75 carried by said ratchet wheel and a spur gear 76 mounted on the eccentric hub 77 of said ratchet wheel, said spur gear being held against rotation by a dog 78 pivotally connected with one of the side sills 11 by a link 79. A device of this character is fully shown and described in Letters Patent No. 1,215,614, to Theophilus Brown, dated February 13, 1917, and, therefore, need not be explained in detail herein. It will suffice to say that as the ratchet wheel 73 is rotated in a clockwise direction as viewed in Fig. 3, the upper course of the apron 65 is caused to travel rearwardly. It will be evident that inasmuch as the cam 36 actuates the lever 68 intermittently, the ratchet wheel 73 will be rotated intermittently, and consequently the movement of the apron is intermittent also. As the cam 36 is mounted on the countershaft 26, whenever the auxiliary beater is driven the apron 65 will be actuated, but the movement of the beater will be continuous whereas that of the apron will be intermittent, notwithstanding that they are both actuated by said countershaft. It is manifest, also, that the main and auxiliary beaters will both be driven at a higher rate of speed than the apron.

It is occasionally necessary or desirable to change the rate of travel of the apron, or, in other words, the distance it is moved on each operative stroke of the lever 67, and my improved construction provides means by which the operator can make such adjustment without leaving his seat and also without having to move the load in accomplishing it.

For accomplishing this purpose a feed adjusting lever 80 is provided, which is mounted on the vehicle body adjacent to the driver's seat, as shown in Fig. 4, and has associated therewith any suitable locking means for holding it in a fixed position, such as a notched sector 81 and the usual hand operated latch 82. The lever 80 is fulcrumed at 83, so that it swings fore and aft, and to it is connected the forward end of a rod 84 which extends back to and a short distance beyond the lever 68, as best shown in Fig. 3. The rear end of said rod is supported by a sleeve 85 which is pivotally connected with the lower portion of the lever 68 by a pivot 86 so that it may rock about a transverse axis. Said rod is adapted to slide in said sleeve, and the rear end of said rod carries a fixed stop 87 secured thereto in any suitable way, as by a set screw 88, so that it may be adjusted longitudinally thereof should occasion require. Between the stop 87 and the sleeve 85 is a cushioning spring 89 mounted on the rod 84. The stop 87 is provided with a sleeve 90 that extends toward the lever 68 parallel with the rod 84, which sleeve is adapted to receive a plunger 91 that projects rearwardly from a movable stop 92 fitted loosely on the rod 84 in advance of the sleeve 85, against the forward end of which it bears. The stop 87 is provided with a lug 93, and the stop 92 is provided with a lug 94, as shown in Fig. 3, which lugs are connected by a spring 95 which tends to hold the two stops together, with the plunger 91 incased by the sleeve 90.

It will be seen from the foregoing description that the sleeve 85 connected with the lever 68 is interposed between the stationary stop 87 and the movable stop 92, and that when said lever is given an operative stroke, or, in other words, is swung in a counter-clockwise direction as viewed in Fig. 3, and the rod 84 is held against endwise movement by the locking devices associated with the lever 80, as is normally the case, the rearward movement of the lower end of the lever 68 will compress the spring 89, which will not only cushion it, but after the roller 68a passes off the high part of the cam 36 will restore the lever 68 to its normal position. When the parts are as shown in Fig. 3, the apron 65 will advance the greatest possible distance upon each operative stroke of the lever 68, since the roller 68a is shown as being in engagement with the lowest part of the cam 36, and rotation of the cam will consequently move it the greatest distance that said cam is capable of moving it. By, however, setting the lever 68 so that its normal position when retracted is such that the roller 68a is not in contact with the cam at that time, but is removed therefrom to a greater or less extent, obviously rotation of the cam will not give the lever so long a stroke, and consequently the apron 65 will not be moved so far each time said lever is actuated. This setting may be effected by moving the lever 80 rearwardly, thereby moving the stop 87 rearwardly from the position shown in Fig. 3, as illustrated in Fig. 6. When this is done it will tend to stretch the spring 95, since the movable stop 92 will be kept from following up the stop 87 under the influence of said spring because of the resistance presented to movement of the lever 68 by the load.

Consequently the parts will then assume the position shown in Fig. 6, and will retain such position until the cam 36 is rotated the next time. When this occurs the lever 68 will be rocked by means of said cam, thereby moving the sleeve 85 back into engagement with the spring 89 and permitting the movable stop 92 to return to its normal distance from the fixed stop 87. After the high part of the cam 36 passes off of the roller 68a, the spring 89 will move the lever 68 in the reverse direction, but its upper end will not be carried back so far as it was before the adjustment of the rod 84 was effected, because, owing to the rearward movement of said rod, the position of the stops 92 and 87 will have been shifted rearwardly, and, therefore, the stop devices as a whole will tend to hold the sleeve 85 normally at a point to the right of its first position, as indicated by the dotted lines in Fig. 6. This will throw the roller 68a to the left of the position shown in Fig. 3, to a greater or less extent, depending on how much of an adjustment has been made, and, therefore, the next time the cam 36 operates, and in all succeeding operations thereof until the feeding devices have again been adjusted, the stroke of the lever 68 effected by the operation of said cam will be shortened more or less in accordance with the adjustment made. In other words, the normal position of the lever 68 with respect to the cam 36 is varied, with consequent variation in the length of the operative stroke of said lever. In making this adjustment the operator does not have to move the load, but he merely manipulates the stop devices that control the normal position of the lever 68, independently of the load, so that the next time the lever is actuated by the power mechanism, it will return to its new normal position and will continue to use that position until further adjustment is made by the operator.

While I prefer to embody my invention as specifically illustrated and described herein, I wish it to be understood that it is not limited to such specific construction, except in so far as claims may be directed thereto, as it will be apparent that various changes and modifications of such structure may be made without departing from the invention pointed out in the generic claims.

I claim:

1. In a manure spreader of the type comprising a vehicle body having a rear axle, a rotatable beater, and conveying means in the bottom of the body for moving the manure rearwardly to said beater, driving mechanism for intermittently driving said conveying means, comprising a swinging lever mounted on the vehicle body, means actuated by the swinging of said lever in one direction for moving said conveying means rearwardly, and a single means for swinging said lever and driving said beater.

2. In a manure spreader of the type comprising a vehicle body having a rear axle, a rotatable beater, and conveying means in the bottom of the body for moving the manure rearwardly to said beater, driving mechanism for intermittently driving said conveying means, comprising a swinging lever mounted on the vehicle body, means actuated by the swinging of said lever in one direction for moving said conveying means rearwardly, and rotating means for swinging said lever, said means also driving said beater.

3. In a manure spreader of the type comprising a vehicle body having a rear axle, a rotatable beater, and conveying means in the bottom of the body for carrying the manure rearwardly to said beater, driving mechanism for intermittently driving said conveying means, comprising a swinging lever mounted on the vehicle body, means actuated by the swinging of said lever in one direction for moving said conveying means rearwardly, rotating means for driving said beater, said rotating means including means for swinging said lever, and means for driving said rotating means.

4. In a manure spreader of the type comprising a vehicle body having a rear axle, a rotatable beater, and conveying means in the bottom of the body for carrying manure rearwardly to said beater; driving mechanism for driving said beater and for intermittently driving said conveying means, the latter comprising a swinging lever mounted on the vehicle body, means actuated by the swinging of said lever in one direction for moving said conveying means rearwardly, and a rotating cam mounted on said vehicle body for swinging said lever.

5. In a manure spreader of the type comprising a vehicle body, a main beater at the rear of the vehicle body, an auxiliary beater mounted on the upper portion of the vehicle body, and means in the bottom of the body for conveying the manure rearwardly to said beaters; driving mechanism for intermittently driving said means, comprising a swinging lever mounted on the vehicle body, means actuated by the swinging of said lever in one direction for moving said first-mentioned means rearwardly, and rotating means mounted on the upper portion of the vehicle body for swinging said lever, said rotating means also actuating said beaters.

6. In a manure spreader of the type comprising a vehicle body, a rotatable beater at the rear of the vehicle body, and conveying means for carrying manure to said beater; driving mechanism for intermittently driving said conveying means, comprising a swinging lever mounted on the vehicle body, means actuated by the swinging of said lever in one direction for moving said conveying means rearwardly, a countershaft mounted on the vehicle body, means for driving said countershaft, means for driving the beater from said countershaft, and a cam mounted on said countershaft for actuating said lever.

7. In a manure spreader of the type comprising a vehicle body, a rotatable beater at the rear of the vehicle body, and conveying means for carrying manure to said beater, driving mechanism for intermittently driving said conveying means, comprising a swinging lever mounted on the vehicle body, means actuated by the swinging of said lever in one direction for moving said conveying means rearwardly, a single rotating means for actuating said beater and swinging said lever, a rod adjustable longitudinally of the vehicle to regulate the stroke of said lever, and means for locking said rod in its different positions of adjustment.

8. In a manure spreader of the type comprising a vehicle body, a rotatable beater at the rear of the vehicle body, and conveying means for carrying manure to said beater; driving mechanism for intermittently driving said conveying means, comprising a swinging lever mounted on the vehicle body, means actuated by the swinging of said lever in one direction for moving said conveying means rearwardly, rotating means for actuating said beater, said rotating means also swinging said lever, a rod adjustable longitudinally of the vehicle to regulate the stroke of said lever, means for locking said rod in its different positions of adjustment, a fixed stop carried by said rod, a cushioning spring interposed between said lever and said stop and adapted to be compressed on the operative stroke of said lever, a movable stop for determining the normal position of said lever, and a spring connecting said stops and tending to prevent separation thereof.

9. In a manure spreader of the type comprising a vehicle body, a rotatable beater at the rear of the vehicle body, and conveying means for carrying manure to said beater; driving mechanism for intermittently driving said conveying means, comprising a swinging lever mounted on the vehicle body, means actuated by the swinging of said lever in one direction for moving said conveying means rearwardly, rotating means for actuating said beater and swinging said lever, a rod adjustable longitudinally of the vehicle to regulate the stroke of said lever, means for locking said rod in its different positions of adjustment, a fixed stop carried by said rod, a cushioning spring interposed between said lever and said stop and adapted to be compressed on the operative stroke of said lever, a movable stop at the opposite side of said lever from said fixed stop and serving to determine the normal position of said lever, and a spring connecting said stops together and tending to prevent separation thereof.

10. In a manure spreader of the type comprising a vehicle body having a traction driven rear axle, a rotatable beater at the rear of the vehicle body, and conveying means for feeding manure to said beater; driving mechanism for intermittently driving said conveying means, comprising a swinging lever mounted on the vehicle body, means actuated by the swinging of said lever in one direction for moving said conveying means rearwardly, rotating means driven from said rear axle for actuating said beater and swinging said lever, a rod adjustable longitudinally of the vehicle to regulate the stroke of said lever, means for locking said rod in its different positions of adjustment, a fixed stop carried by said rod, a cushioning spring interposed between said lever and said stop and adapted to be compressed on the operative stroke of said lever, a movable stop telescopically connected with said fixed stop and engaging said lever at the opposite side thereof from said fixed stop, and a spring tending to prevent separation of said stops.

11. In a manure spreader of the type comprising a vehicle body, a main beater at the rear of the vehicle body, an auxiliary beater mounted on the upper portion of the vehicle body, and conveying means in the bottom of the body for conveying the manure rearwardly to said beaters, of driving means for said beaters, and means connecting said auxiliary beater with said conveying means for intermittently driving said conveying means, comprising a swinging lever mounted on the vehicle body, and rotating means mounted on the auxiliary beater for swinging said lever.

12. In a manure spreader of the type comprising a vehicle body, a main beater at the rear of the vehicle body, an auxiliary beater mounted on the upper portion of the vehicle body, and conveying means in the bottom of the body for conveying the manure rearwardly to said beaters, driving means for said beaters, and means connecting said auxiliary beater with said conveying means for intermittently driving said conveying means, comprising a swinging lever mounted on the vehicle body, a roller rotatably mounted on said lever, and rotating means mounted on the auxiliary beater and co-acting with said roller for swinging said lever.

13. In a manure spreader of the type comprising a vehicle body, a main beater at the rear of the vehicle body, an auxiliary beater mounted on the upper portion of the vehicle body, and conveying means in the bottom of the body for conveying the manure rearwardly to said beaters, driving means for said beaters, and means connecting said auxiliary beater with said conveying means for intermittently driving said conveying means, comprising a swinging lever mounted on the vehicle body, a roller rotatably mounted on said lever, adjustable means for regulating the stroke of said lever, and rotating means mounted on the auxiliary beater and co-acting with said roller for swinging said lever.

14. In a manure spreader of the type comprising a vehicle body, a main beater at the rear of the vehicle body, an auxiliary beater mounted on the upper portion of the vehicle body, and conveying means in the bottom of the body for conveying the manure rearwardly to said beaters, driving means for said beaters, and means connecting said auxiliary beater with said conveying means for intermittently driving said conveying means, comprising a swinging lever mounted on the vehicle body, a roller rotatably mounted on said lever, a rotating cam mounted on said vehicle body and cooperating with said roller for swinging said lever, and means for varying the position of said lever relatively to said cam.

15. In a manure spreader of the type comprising a vehicle body, a main beater at the rear of the vehicle body, an auxiliary beater mounted on the upper portion of the vehicle body, and conveying means in the bottom of the body for conveying the manure rearwardly to said beaters, driving means for said beaters, and means connecting said auxiliary beater with said conveying means for intermittently driving said conveying means, comprising a swinging lever mounted on the vehicle body, a roller rotatably mounted on said lever, a rotating cam mounted on the vehicle body and cooperating with said roller for swinging said lever, a rod adjustable longitudinally of the vehicle to regulate the stroke of said lever, and means for locking said rod in its different positions of adjustment.

16. In a manure spreader of the type comprising a vehicle body, a rotatable beater mounted adjacent to the rear of said body, conveying means in the bottom of the body for moving the manure rearwardly to said beater, driving mechanism mounted on the upper portion of the vehicle body for driving said beater and for intermittently driving said conveying means, and means cooperating with said driving means for varying the longitudinal movement rearwardly of said conveying means.

17. In a manure spreader of the type comprising a vehicle body, a main beater at the rear of the vehicle body, an auxiliary beater mounted on the upper portion of said vehicle body, and conveying means for carrying manure to said beaters, means for intermittently driving said conveying means, comprising a swinging lever mounted on the vehicle body, means actuated by the swinging of said lever in one direction for moving said conveying means rearwardly, a countershaft mounted on the vehicle body, means for driving said countershaft, means for driving said main and auxiliary beaters from said countershaft, and means mounted on said countershaft for actuating said lever.

18. In a manure spreader of the type comprising a vehicle body, a main beater mounted at the rear of the vehicle body, an auxiliary beater mounted on the upper portion of the vehicle body, and conveying means for carrying manure rearwardly to said beaters, means for intermittently driving said conveying means, comprising a swinging lever mounted on the vehicle body, means actuated by the swinging of said lever in one direction for moving said conveying means rearwardly, a countershaft mounted on the vehicle body, means for driving said countershaft, means for driving said main and auxiliary beaters from said countershaft, and means mounted on said countershaft and cooperating with said lever for swinging the same.

19. In a manure spreader having a conveyor for conveying the manure to a beater, reciprocating means for operating said conveyor, and means for regulating the length of stroke of said reciprocating means including a spring resisted extensible connection adapted to extend whenever operation of said regulating means tends to operate said reciprocating means, said connection comprising a pair of relatively movable members and spring means resisting such relative movement, one of said members tending to move said reciprocating means when the other of said members is shifted.

20. In a manure spreader having a conveyor for conveying the manure to a beater, reciprocating means for operating said conveyor, a stop for regulating the length of stroke of said reciprocating means, and means for adjusting the position of said stop including a spring connected with the stop to position the same and adapted to yield whenever adjusting the position of said stop tends to operate said reciprocating means.

21. In a manure spreader having a conveyor for conveying the manure to a beater, reciprocating means for operating said conveyor, and means for regulating the length of stroke of said reciprocating means comprising an adjustable stop, a longitudinally movable rod, and a spring connecting said rod and said stop and adapted to yield whenever adjusting the position of said stop tends to operate said reciprocating means.

22. In a manure spreader having a conveyor for conveying the manure to a beater, reciprocating means for operating said conveyor, and means for regulating the length of stroke of said reciprocating means comprising a longitudinally movable rod, an adjustable stop mounted on said rod, a fixed stop carried by said rod and spaced from said movable stop, and a spring connecting said stops and adapted to yield whenever adjusting the position of said adjustable stop tends to operate said reciprocating means.

23. In a manure spreader having a conveyor for conveying the manure to a beater, reciprocating means for operating said conveyor comprising a swinging lever, means for regulating the stroke of said lever comprising a longitudinally movable rod, a movable stop mounted on said rod and serving to determine the normal position of said lever, a fixed stop on said rod, and a spring connecting said stops and adapted to yield whenever adjusting the position of said rod tends to operate said lever, said spring serving to move said movable stop along said rod toward said fixed stop upon swinging of said lever.

24. In a manure spreader having a conveyor for conveying the manure to a beater, reciprocating means for operating said conveyor comprising a swinging lever, means for regulating the stroke of said lever comprising a longitudinally movable rod, a movable stop mounted on said rod and normally serving to limit movement of said lever in one direction, and a spring connecting said rod and said stop and adapted to yield whenever movement of the rod in adjusting the position of said stop tends to operate said lever, said spring serving to move said stop to adjusted position upon swinging of the lever in the other direction.

25. In a manure spreader having a conveyor for conveying the manure to a beater, reciprocating means for operating said conveyor comprising a swinging lever, and means for regulating the length of stroke of said lever including a longitudinally movable rod and spring means connected with said rod and adapted to limit the movement of the lever in one direction, said spring means being adapted to yield whenever movement of said rod tends to operate said lever.

Signed at Sherkston, in the Province of Ontario, and Dominion of Canada, this 2nd day of July, 1929.

ALBION STORM.